US007256978B2

(12) United States Patent
Deines et al.

(10) Patent No.: US 7,256,978 B2
(45) Date of Patent: Aug. 14, 2007

(54) GAPPED GROUND SAFETY DEVICE

(75) Inventors: Terence Donald Deines, Burnaby (CA); Christopher Paul Morton, Surrey (CA); Jack H. Sawada, Richmond (CA); Ching Wah Shum, Vancouver (CA)

(73) Assignee: British Columbia Hydro and Power Authority, Vancouver, British Columbia (CA)

( * ) Notice: Subject to any disclaimer, the term of this patent is extended or adjusted under 35 U.S.C. 154(b) by 147 days.

(21) Appl. No.: 10/660,503

(22) Filed: Sep. 12, 2003

(65) Prior Publication Data

US 2004/0169970 A1 Sep. 2, 2004

(51) Int. Cl.
*H02H 1/00* (2006.01)

(52) U.S. Cl. ....................................... 361/117; 361/120

(58) Field of Classification Search ................ 361/117, 361/118, 119, 120, 121, 122–127
See application file for complete search history.

(56) References Cited

U.S. PATENT DOCUMENTS

| | | | | |
|---|---|---|---|---|
| 2,473,850 | A * | 6/1949 | Beck et al. | 361/127 |
| 4,625,254 | A * | 11/1986 | Fahlen | 361/16 |
| 4,912,592 | A * | 3/1990 | Flindall et al. | 361/120 |
| 5,289,335 | A * | 2/1994 | Kato | 361/117 |
| 5,500,782 | A * | 3/1996 | Oertel et al. | 361/120 |
| 5,621,602 | A * | 4/1997 | Winkelmann | 361/104 |
| 6,788,519 | B2 * | 9/2004 | Zahlmann et al. | 361/129 |

* cited by examiner

*Primary Examiner*—Brian Sircus
*Assistant Examiner*—Danny Nguyen
(74) *Attorney, Agent, or Firm*—Oyen Wiggs Green & Mutala LLP

(57) ABSTRACT

A gapped ground safety device is provided to protect workers on de-energized underground distribution cable from ground faults or accidental energization. The device comprises a combination precision gap and an MOV surge arrester.

13 Claims, 3 Drawing Sheets

GAPPED GROUND SAFETY DEVICE

TECHNICAL FIELD

The invention relates to the field of safety devices for persons working on underground electrical transmission cables. More particularly the invention relates to a device for workplace grounding which protects the worker against potential rise due to ground faults as well as accidental energization of the cable.

BACKGROUND

When maintenance work is required on distribution cables, to protect the worker from accidental energization of the cable, the common industry practice is to ground the cable section at both terminals. However there are some drawbacks with such a safety procedure. First, some testing or maintenance procedures requires that the cable core be “floating” and do not permit the section of cable core in question to be grounded. Second, if a ground fault occurs, for example, at the substation, the rise in potential of the station ground will cause significant current to flow through the grounded cable sheath which, due to mutual coupling, induces voltage in the cable core. Simultaneously, the induced voltage in the core will force current to flow which is proportional to the closed circuit impedance formed by the cable core, terminal effective grounding impedances and the sheath conductor which is in parallel with the earth ground return. Therefore, any significant reduction of the terminal impedance by grounding an isolated cable core may cause dangerous current to flow through the worker. There is therefore a need for a safety device which protects a worker both from accidental energization and from ground fault when working on a distribution cable.

SUMMARY OF THE INVENTION

The invention therefore provides a safety device for protecting a worker from accidental energization of a distribution cable and ground faults, comprising a main insulated gap formed between two conductors, a precision gap between the two conductors, and connected in parallel with the precision gap a surge arrester and a resistor in series. According to a further aspect of the invention, the passive precision gap can be replaced by an externally controlled switch or triggered gap which will perform a similar function to the precision gap but which initiates the bypass operation at a faster rate than the passive gap by employing an intelligent control.

BRIEF DESCRIPTION OF THE DRAWINGS

In drawings which disclose a preferred embodiment of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

In this description the term “precision gap” refers to a gap arrester or similar device in which the flashover level is confined to a narrow band. A normal air gap or parallel gap has a less predictable flashover level.

Figure 1:
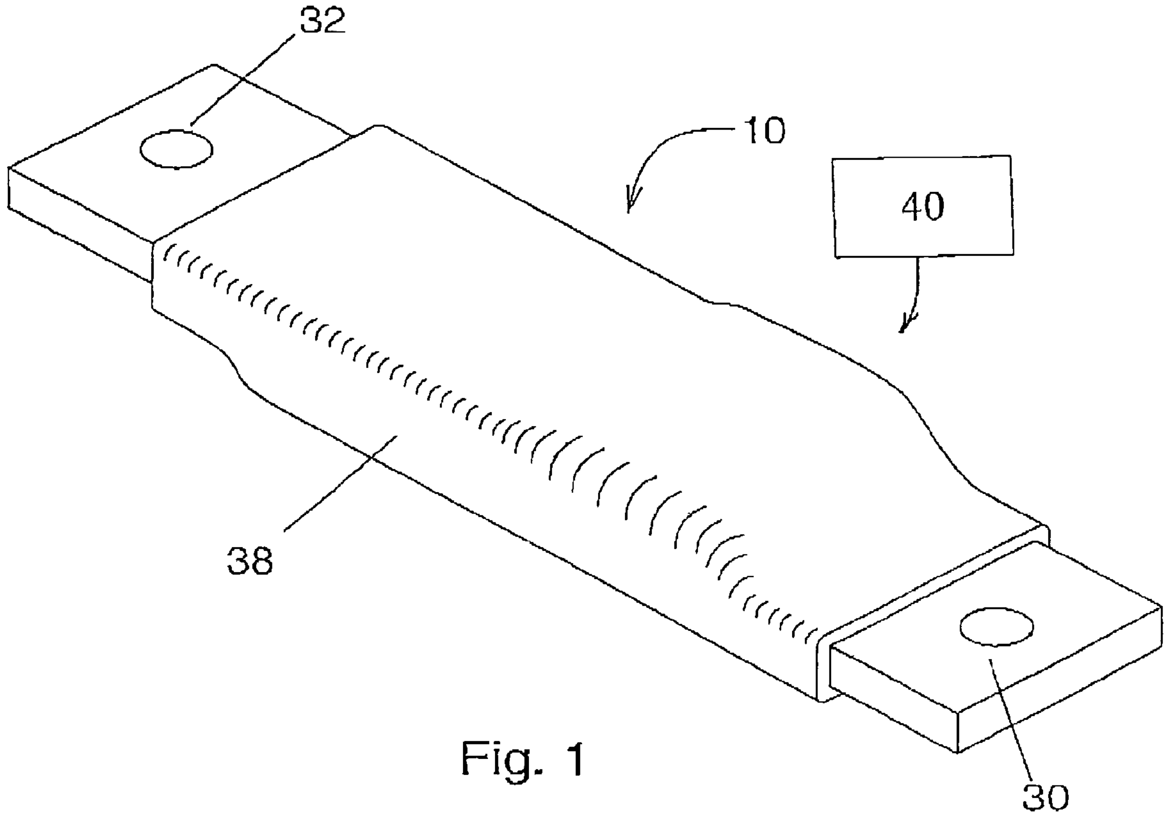
FIG. 1 is a perspective view of the gapped ground safety device of the invention.
Figure 2:
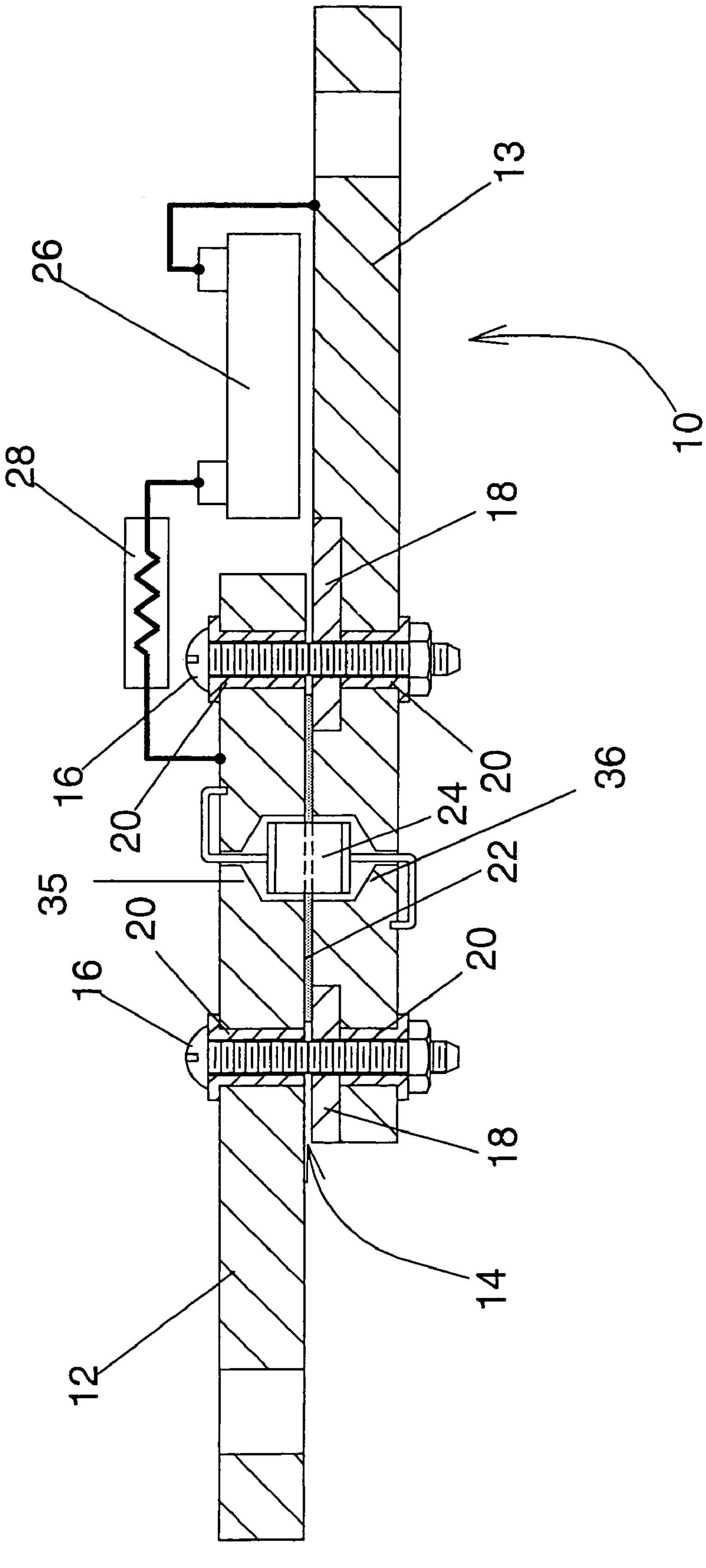
FIG. 2 is a partially schematic view of the device shown in FIG. 1 in longitudinal cross-section.
Figure 3:
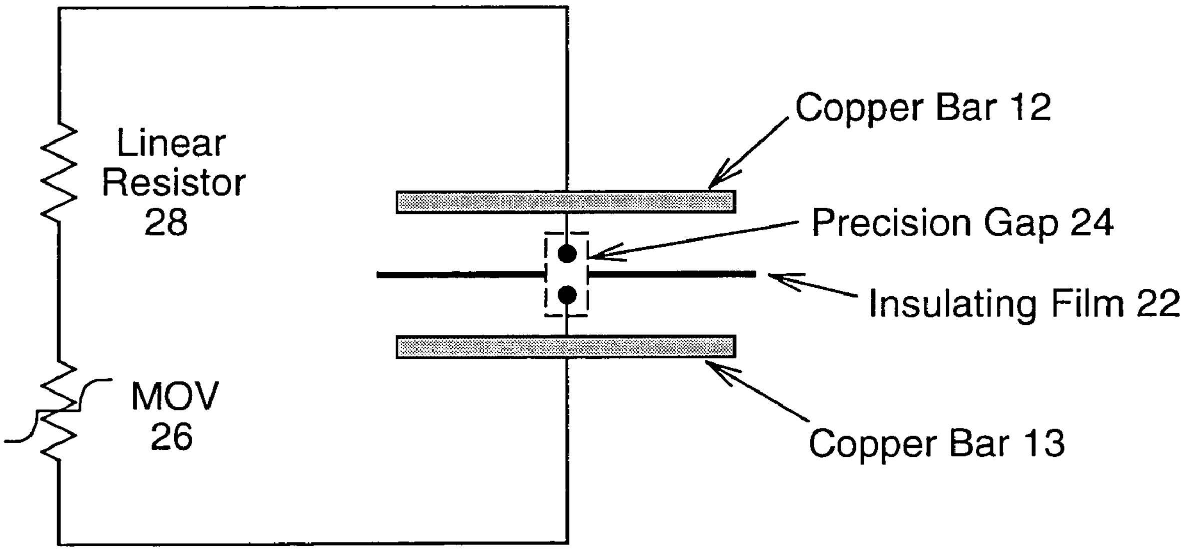
FIG. 3 is a simplified circuit diagram of the invention.

With reference to FIGS. 1 and 2, the preferred embodiment of the gapped ground safety device 10 incorporates a single protective gap, described as follows. In FIG. 1 the components of the device 10 are enclosed in an insulating medium 38. The gap comprises a copper bar 12 electrically separated from a second copper bar 13 by an insulating film 22 located in gap 14. The two bars 12, 13 are secured together by bolts 16 which are insulated from bars 12, 13 by insulated spacers 20 and insulated spacer bars 18. The spacing of the copper bars 12, 13 to form the gap 14 is maintained by the insulated spacer bars 18 and/or the insulating film 22. Preferably the copper bars 12, 13 are about ⅜ inches thick by 2 inches wide, have a short time rating of approximately 40 to 50 kiloamperes$^2$-seconds and are of smooth copper machined to form a consistent flat surface.

A precision gap is formed between copper bars 12, 13 by gap arrester 24. A two-electrode gas-discharge-tube-type surge arrester is used such as the Y08 series solid state surge arrester previously manufactured by SANKHOSA Devices. These are constructed of two metal electrodes sealed in a gas-filled ceramic cylinder. The Y08-302B with a breakdown voltage of 3000V is preferred, although a range of breakdown voltages from 100V to 10,000V would also be useful depending on the insulation layer in the main gap. Recessed pockets 35, 36 are drilled in each of the copper bars 12, 13 to receive the precision gap arrester 24.

Connected in parallel with the gap arrester 24 is a MOV (metal oxide varistor) surge arrester 26. The MOV surge arrester 26 is connected in series with a linear resistor 28. Preferably the MOV arrester 26 has a voltage rating somewhat below the precision gap flashover and preferably 10% below or about 2800 volts and a 1500 joule energy rating. The Industrial High Energy Metal Oxide Varistors MOV manufactured by Littelfuse (formerly Harris Suppression Products) are suitable. An MOV is a non-linear, voltage dependent device which acts like back-to-back Zener diodes. Resistor 28 has a 50-100 ohm rating preferably, but a range from 20 to 10,000 ohms is possible depending on the flashover level of the precision gap.

The MOV 26 serves to protect the precision gap 24 from flashing during a ground fault where a potential difference up to 3000 volts (which is the largest ground fault potential that will generally be encountered) can be expected. At the MOV protective voltage, the MOV begins to conduct significant current without significant increase in the MOV residual voltage. However, due to the presence of the resistor 28, the gap voltage will increase linearly with the current above the MOV protective voltage so that the precision gap will eventually flash when the voltage across the gap exceeds the precision gap flashover voltage range of 2800-3200V, caused by an accidental energization of the distribution cable. When the precision gap flashes and creates a fault, the current flow causes the precision gap to fail violently which destroys the insulation strength in the region around the precision gap and triggers arcing to occur between the copper bars. The high current arc melts the surface of the copper bars, which causes the copper bars to become shorted together.

To protect the worker who is working on a distribution cable which has been de-energized, the device 10 is connected at one terminal 30 to the distribution cable and at the other terminal 32 to ground. The MOV arrester will ensure that isolation is maintained by the precision gap 24 during ground fault events, but if there is a large power surge caused by accidental energization of the line, the precision gap 24 will very quickly flash and the distribution cable core will become grounded.

In order to provide an indication to the worker whether the device has been triggered, a visual indicator such as a red flashing LED, or a microfuse (not shown) may be provided which activates when high current levels pass through the device 10.

While the precision gap structure noted above is described as a passive device, the passive precision gap can be replaced by an externally controlled switch or triggered gap which will perform a similar function to the precision gap but which initiates the bypass operation at a faster rate than the passive gap by employing an intelligent control 40.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A safety device for protecting a worker from accidental energization or potential rise due to ground fault events of a distribution cable, comprising a main insulated gap formed between two conductors, one conductor being adapted for electrical connection to ground and the second conductor being adapted for electrical connection to said distribution cable, a precision gap between said two conductors, and connected in parallel with said precision gap a surge arrester and a resistor in series, wherein said surge arrester has a voltage rating below the breakdown voltage of said precision gap whereby said surge arrester prevents said precision gap from flashing during a ground fault event up to said voltage rating, and, wherein said main insulated gap comprises the two opposed conductors electrically separated by said insulation extending into a region proximate to said precision gap, whereby when said precision gap flashes, insulation in said region is destroyed and a short circuit forms between said conductors.

2. The safety device of claim 1 wherein said precision gap comprises a gap arrester.

3. The safety device of claim 2 wherein said gap arrester comprises a gas discharge tube arrester.

4. The safety device of claim 2 wherein said gap arrester has a breakdown voltage between 100V and 10,000V.

5. The safety device of claim 2 wherein said gap arrester has a breakdown voltage of approximately 3000V.

6. The safety device of claim 1 wherein said surge arrester comprises an MOV arrester.

7. The safety device of claim 1 wherein said conductors comprise two conductive bars secured together and insulated from each other.

8. The safety device of claim 1 wherein said surge arrester has a voltage rating approximately 10% below that of the precision gap.

9. The safety device of claim 1 wherein said resistor is a linear resistor.

10. The safety device of claim 9 wherein said resistor has a resistance from 20 to 10,000 ohms.

11. The safety device of claim 9 wherein said resistor has a resistance from 50 to 100 ohms.

12. The safety device of claim 1 wherein said precision gap comprises an intelligent control to trigger the breakdown of said precision gap.

13. The safety device of claim 1 wherein said insulation in said region proximate to said precision gap consists of an insulating film.

* * * * *